3,010,981
METHOD OF PREPARING BIFERROCENYL
Marvin D. Rausch, Dayton, Ohio, assignor to Monsanto Chemical Company, St. Louis, Mo., a corporation of Delaware
No Drawing. Filed Feb. 29, 1960, Ser. No. 11,436
8 Claims. (Cl. 260—439)

This invention is directed to ferrocene type compounds and more particularly is directed to a process for preparing biferrocenyl from haloferrocenes.

Biferrocenyl has been found in trace amounts as a dark orange, sublimable crystalline solid as a by-product in a reaction relating to the synthesis of long-chain trialkylsilylferrocenes from the reaction of ferrocenyllithium and trialkylchlorosilanes.

It is the purpose of this invention to provide an improved process for preparing biferrocenyl.

According to this invention biferrocenyl is prepared in high yield ranging from 60% to almost quantitative yields by heating a haloferrocene in the presence of copper according to the following chemical equation:

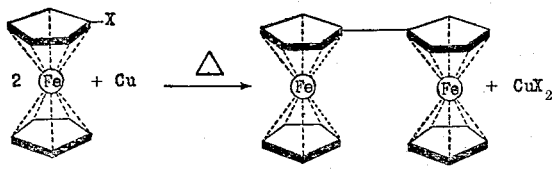

wherein X is selected from the group consisting of bromine, chlorine, and iodine, at a temperature of from 60° C. to 180° C., until biferrocenyl is produced.

In the preferred embodiment of this invention biferrocenyl is prepared by heating a haloferrocene as defined above in admixture with activated copper at a temperature of from 150° C. to 160° C., in the presence or absence of air, until a substantial quantity of the haloferrocene has reacted to produce biferrocenyl. The biferrocenyl product can readily be recovered from the reaction mixture by known methods, e.g., solvent extraction, and purified in a similar manner.

The haloferrocenes useful for the purposes of this invention are monohaloferrocenes, i.e., ferrocenes having one bromine, chlorine, or iodine atom attached to one of the cyclopentadienyl rings, and are obtained readily, for example, by the method described by A. N. Nesemeyanov et al., Doklady Akad. S.S.S.R., vol. 100, pp. 1099–1101 (1955). Iodoferrocene was thus prepared by the gradual addition of iodine solution to a hot xylene solution of ferrocenyl mercuric chloride, a light gray-green precipitate being formed. On the addition of a larger excess of iodine the replacement of the mercury in the complex by iodine took place and the light gray-green precipitate was converted into a black precipitate. After cooling the solution, the precipitate was washed with alcohol, carefully ground, and mixed for one and one-half hours with an aqueous solution of sodium thiosulfate. This operation was repeated twice, after which the precipitate was washed several times with ether. The ether extracts were combined and the ether was evaporated. The yield of the iodoferrocene which was obtained in this way was 64% of the theoretical. Bromoferrocene is prepared in the same manner and bromo- and chloroferrocenes can be prepared from ferrocenylboronic acid, for example, as described in Doklady Akad. Nauk S.S.S.R., vol. 126, p. 1004 (1959).

The copper used for the purpose of this invention can be ordinary metallic copper, sometimes referred to as copper bronze, and may be in any desired physical form. In this invention powdered copper is preferred since it is to be used in a heterogeneous system and it is desired in such a case to have as intimate contact between the reactants as possible. This may be done, e.g., by mixing the haloferrocene with the copper prior to the heating step. Since copper metal usually acquires surface coatings of copper oxides thereon, it is ordinarily preferred for the purpose of this invention to treat the copper to render it more reactive. Various treatments for this purpose are known. The following procedure was used to activate the copper for the purpose of the specific examples given below:

To one hundred grams of copper powder there is added 1 liter of a 2 percent solution of iodine in acetone for 5–10 minutes. This results in the formation of a rather grayish colour due to the formation of copper iodide. The product is filtered on a Büchner funnel, removed, and washed by stirring with 500 ml. of 1:1 solution of concentrated hydrochloric acid in acetone. The copper iodide dissolves and the residual copper powder is filtered and washed with acetone. It is then dried in a vacuum desiccator. The thus obtained activated copper should be used immediately after preparation.

The haloferrocene and copper may be combined in any desired manner. Where complete reaction of the haloferrocene is desired at least stoichiometric amounts of copper to haloferrocene are used. A general excess of copper on the order of up to two to three times the molar amount of haloferrocene used is not unusual where rapid and complete reaction of the haloferrocene is desired. The haloferrocene and copper may be contacted in any desired manner for operation in a batch or continuous process. It is only necessary that the haloferrocene in contact with the copper be heated to within the range of 60° C. to 180° C. for a time sufficient to effect formation of biferrocenyl. Indications are that within this temperature range, under optimum conditions, very short reaction times are needed. When operating within the preferred method of this invention i.e. when an intimate mixture of haloferrocene and activated copper are heated to 150° C. to 160° C. reaction is completed within a few minutes. Longer heating times are usually used to insure complete reaction and efficient use of reactants. However, longer reaction times on the order of one-half to twenty hours are not unusual under varying conditions of reaction. Factors such as amount of copper used, degree of activation of the copper, the physical form of the copper used, absence or presence of a diluent material, etc. will have some influence on the reaction time.

Heating of the haloferrocene in the presence of copper may be conducted in the absence or in the presence of a liquid inert diluent. Examples of organic liquids useful for the present purposes are such common organic solvents such as benzene, xylene, biphenyl, hexane, heptane, dimethylformamide, etc.

Heating of haloferrocene in the presence of copper results in a condensation of two molecules of haloferrocene to produce one molecule of biferrocenyl with the release of two atoms of halogen which is taken up by the copper. This reaction does not proceed to any appreciable extent in the absence of copper. Biferrocenyl is perhaps best removed from the reaction mixture by solvent extraction or sublimation. Biferrocenyl is soluble in such organic liquids as hexane, heptane, benzene, xylene, etc., and is readily taken up therein, leaving the copper and copper halide by-product as residue. The biferrocenyl may then be crystallized from the organic solvent used, and redissolved and recrystallized if further purification is desired. The copper residue containing copper halide can be treated as indicated above to remove the halide ion and be used again in the process if desired.

The biferrocenyl product obtained according to the method of this invention is generally orange and crystalline at ordinary temperatures, melting at 237°–239° C., and is useful, e.g., as a fuel additive.

Example 1

A mixture of iodoferrocene (0.592 g., 0.0019 mole) and activated copper bronze (1.27 g., 0.02 mole) was placed in a glass tube that had previously been flushed with pure dry nitrogen gas. The tube was sealed and inserted into a bath of silicon oil. The completely immersed tube was maintained at 150° C.–160° C. for 15½ hours, then opened and the contents thoroughly extracted with hot benzene. Evaporation of the benzene left an orange residue, 0.340 g., M.P. 237–240° C. with some decomposition in air in 97% yield. The residue was carefully recrystallized from a minimum amount of hot heptane to yield dark orange crystals, weighing 0.303 g., M.P. 239°–240° C. with some decomposition in air. The compound was identified as biferrocenyl by elemental analysis and cryoscopic molecular weight, viz:

| | Found | Anal. Calcd. For $(FeC_{10}H_9)_2$ |
|---|---|---|
| Percent C | 64.99 | 64.91 |
| Percent H | 4.97 | 4.90 |
| Percent Fe | 30.09 | 30.19 |
| Molecular Weight | 360 | 370 |

Example 2

A mixture of 0.11 g. (0.000415 mole) of bromoferrocene, M.P. 31–30° C., and 0.26 g. (0.004 mole) of activated copper was placed into a glass tube previously flushed with nitrogen and the tube was sealed. The tube was heated in a silicone bath at 158° C. for 16 hours. The tube was then opened and the contents thereof were extracted with hot benzene to separate insolubles. Evaporation of the benzene solvent left an orange crystalline residue, 0.075 g., M.P. 220–230° C. with some decomposition in air. This material was recrystallized from heptane to produce dark orange needles, 0.065 g., M.P. 234–238° C. (in air), M.P. 234–236° C. (under nitrogen). Biferrocenyl produced by this method appeared identical to that produced by using iodoferrocene. The yield of crude biferrocenyl obtained from bromoferrocene was 97% of theory, and the yield of purified biferrocenyl was 90%.

Example 3

The procedure of Example 2 was repeated except that 0.05 g. (0.000225 mole) of chloroferrocene, M.P. 61–2° C., was used instead of bromoferrocene. After 16 hours of heating the sealed tube at 158° C. in the bath, the tube was opened, the contents thereof extracted with benzene, the benzene evaporated, the residue recrystallized with heptane, to obtain 0.025 g., of purified biferrocenyl, M.P. 233–238° C. (in air), M.P. 234–236° C. (under nitrogen), in a 65% yield.

Example 4

A mixture of 0.405 g. (0.0013 mole) of iodoferrocene and 0.84 g. (0.013 mole) of activated copper was placed in a tube in air, the tube was sealed in air and the tube and the mixture was heated at 130° C. for 16 hours and then at 158° C.–160° C. for 3 hours in a silicone bath. When the heating was discontinued, the contents of the tube were extracted with hot benzene, the benzene evaporated, and then the crude biferrocenyl product was recrystallized from Skellysolve "B" (a mixture of low boiling saturated hydrocarbons), to obtain 0.199 g. of pure biferrocenyl, M.P. 235–237° C. (under nitrogen) in an 83% yield.

Example 5

Into 4 g. of biphenyl (M.P. 70–71° C.) there was mixed 0.405 g. (0.0013 mole) of iodoferrocence and 0.84 g. (0.013 mole) of activated copper powder. The mixture was heated for 16 hours at 130° C. and then for 3 hours at 158–160° C. During the first one-half hour of heating, the mixture was agitated. After removing the biphenyl solvent by extracting the residue with 40 ml. of Skellysolve "B," the residue was extracted with hot benzene to separate the copper and copper iodide by-product from the biferrocenyl product. The benzene was evaporated leaving a residue of 0.130 g. of biferrocenyl, M.P. 237–239° C. (under $N_2$). From the Skellysolve "B" extracts was obtained an additional 0.053 g. of biferrocenyl, for a total yield of 76%.

Example 6

A mixture consisting of 0.624 g. (0.002 mole) of iodoferrocene and 1.28 g. (0.02 mole) of freshly activated copper powder was sealed in a test tube previously flushed with nitrogen to remove any oxygen containing gaseous atmosphere. The tube was then opened, and the contents thereof were extracted with hot benzene. The benzene solution was evaporated to dryness leaving 0.360 g. of orange crystalline biferrocenyl in a 97% yield.

What is claimed is:

1. The method which comprises heating a monohaloferrocene selected from the group consisting of bromoferrocene, chloroferrocene, and iodoferrocene in the presence of copper at a temperature of from 60° C. to 180° C. for a time sufficient to effect formation of biferrocenyl, and recovering the biferrocenyl thus produced.

2. The method which comprises heating a monohaloferrocene selected from the group consisting of bromoferrocene, chloroferrocene, and iodoferrocene in the presence of copper and in the presence of an inert diluent at a temperature of from 60° C. to 180° C. for a time sufficient to effect formation of biferrocenyl, and recovering the biferrocenyl thus produced.

3. The method which comprises heating a monohaloferrocene selected from the group consisting of bromoferrocene, chloroferrocene, and iodoferrocene, in the presence of copper, and in a substantial absence of an oxygen-containing gas at a temperature of from 60° C. to 180° C., for a time sufficient to effect formation of biferrocenyl, and recovering the biferrocenyl thus produced.

4. The method which comprises heating a monohaloferrocene selected from the group consisting of bromoferrocene, chloroferrocene, and iodoferrocene in the presence of activated copper at a temperature of from 150° C. to 160° C. for a time sufficient to effect formation of biferrocenyl, and recovering the biferrocenyl thus produced.

5. The method which comprises heating a monohaloferrocene selected from the group consisting of bromoferrocene, chloroferrocene, and iodoferrocene in the presence of activated copper and in the absence of an oxygen-containing gas at a temperature of from 150° C. to 160° C. for a time sufficient to effect formation of biferrocenyl, and recovering the biferrocenyl thus produced.

6. The method according to claim 5 wherein the monohaloferrocene is bromoferrocene.

7. The method according to claim 5 wherein the monohaloferrocene is chloroferrocene.

8. The method according to claim 5 wherein the monohaloferrocene is iodoferrocene.

No references cited.